US012377014B1

(12) United States Patent
Lai

(10) Patent No.: US 12,377,014 B1
(45) Date of Patent: Aug. 5, 2025

(54) MASSAGE DEVICE

(71) Applicant: Longnan Pinxin Motor Co., Ltd., Jiangxi (CN)

(72) Inventor: Guanxi Lai, Jiangxi (CN)

(73) Assignee: Longnan Pinxin Motor Co., Ltd., Longnan (CN)

( * ) Notice: Subject to any disclaimer, the term of this patent is extended or adjusted under 35 U.S.C. 154(b) by 0 days.

(21) Appl. No.: 18/818,603

(22) Filed: Aug. 29, 2024

(30) Foreign Application Priority Data

Jul. 17, 2024 (CN) ......................... 202421698685.7

(51) Int. Cl.
*A61H 19/00* (2006.01)
*A61H 7/00* (2006.01)
*A61H 23/02* (2006.01)

(52) U.S. Cl.
CPC ............. *A61H 19/30* (2013.01); *A61H 7/007* (2013.01); *A61H 19/34* (2013.01); *A61H 23/0254* (2013.01); *A61H 2007/009* (2013.01); *A61H 2201/1215* (2013.01); *A61H 2201/14* (2013.01); *A61H 2201/1481* (2013.01); *A61H 2201/149* (2013.01); *A61H 2201/1671* (2013.01); *A61H 2201/1676* (2013.01)

(58) Field of Classification Search
CPC ........ A61H 19/00; A61H 19/30; A61H 19/40; A61H 19/44; A61H 19/50; A61H 7/004; A61H 7/005; A61H 7/007; A61H 15/00; A61H 15/0078; A61H 15/0085; A61H 2015/0007; A61H 2015/0014; A61H 2015/0021; A61H 2015/0028; A61H 2015/0035; A61H 23/0254; A61H 2201/1215; A61H 2201/14; A61H 2201/1481; A61H 2201/149; A61H 2201/1671; A61H 2201/1676
See application file for complete search history.

(56) References Cited

U.S. PATENT DOCUMENTS

2009/0069730 A1* 3/2009 Knyrim .............. A61H 23/0263 601/134
2009/0198158 A1* 8/2009 Nan ................... A61H 23/0254 601/87

* cited by examiner

*Primary Examiner* — Carrie R Dorna

(57) ABSTRACT

A massage device includes a driving module and a first massage module. The driving module includes a motor and a rotary rod connected to the motor in a transmission way. The rotary rod is rotatable about a rotary axis and extends curvedly along the rotary axis. The first massage module includes a plurality of first massage members being arranged in a line along the rotary axis. Each first massage member is rotatable relative to a neighboring first massage member about a first axis perpendicular to the rotary axis. Each first massage member defines an engaging groove through which the rotary rod extends, and the rotary rod is slidable relative to the first massage member in a first direction along which the first axis extends and is substantially fixed to the first massage member in a second direction which is perpendicular to the rotary axis and the first axis.

20 Claims, 13 Drawing Sheets

MASSAGE DEVICE

CROSS-REFERENCE TO RELATED APPLICATIONS

This application claims priority to Chinese Patent Application No. 202421698685.7, filed on Jul. 17, 2024, the entire contents of which are hereby incorporated by reference.

TECHNICAL FIELD

The present application relates to the technical field of sex toys, and in particular to a massage device.

BACKGROUND

Nowadays, sex toys have been developed to add pleasures to sexual life, thereby satisfying human physiological and psychological needs to a certain extent.

Generally, the sex toy includes a massage head and a motor driving the massage head to do linear reciprocating motion, thereby providing stimulation to a sensitive area of the human body, such as the clitoris, the vagina and the like. However, such sex toy is difficult to play good massage effect and accordingly the user's massage experience is not ideal.

SUMMARY

An object of the present disclosure is to provide a massage device that is capable of playing good massage effect, thereby improving the massage experience.

In order to achieve the above object, an embodiment of the present disclosure provides a massage device including a driving module and a first massage module. The driving module includes a motor and a rotary rod connected to the motor in a transmission way. The rotary rod is rotatable about a rotary axis and extends curvedly along the rotary axis. The first massage module includes a plurality of first massage members being arranged in a line along the rotary axis. Each of the first massage members is rotatable relative to a neighboring first massage member about a first axis perpendicular to the rotary axis. An engaging groove is defined in each first massage member for extending of the rotary rod therethrough, wherein the rotary rod is slidable relative to the first massage member in a first direction along which the first axis extends and is substantially fixed to the first massage member in a second direction which is perpendicular to the rotary axis and the first axis.

Compared with the prior art, the massage device provided by the present disclosure includes a plurality of first massage members being rotatable relative to each other and a curved rotary rod engaged in the engaging holes of the first massage members, the first massage member is driven to do linear motion in the second direction and swings about the first axis, the first massage module in whole is generally S-shaped and has a motion similar to the wriggling of a snake, which can provide better stimulation effect to the user, so that the user is more likely to reach orgasm with the help of the present massage device, effectively improving the massage experience.

BRIEF DESCRIPTION OF THE DRAWINGS

In order to illustrate the technical solution in embodiments of the present disclosure more clearly, the following briefly introduces accompanying drawings used in the description of the embodiments. Obviously, the accompanying drawings in the following description are only some embodiments of the present disclosure. Those of ordinary skill in the art can obtain other accompanying drawings from these accompanying drawings without any creative efforts.

DESCRIPTION OF THE EMBODIMENTS

In order to make those skilled in the art better understand the technical solution of the present disclosure, the technical solution in the embodiments of the present disclosure will be clearly and completely described below with reference to accompanying drawings in the embodiments of the present disclosure. Obviously, the described embodiments are only a part of the embodiments of the present disclosure, but not all of the embodiments. Based on the embodiments of the present disclosure, all other embodiments obtained by those skilled in the art without any creative efforts fall within the protection scope of the present disclosure.

It should be noted that when an element is said to be "connected" to another element, it may be directly connected to another element, or indirectly connected to another element through one or multiple intermediate elements.

In the specification, the oriental or positional relationships indicated by the terms "longitudinal", "transverse", "top", "bottom", "inner", "outer", "central", "axial", "radial", "circumferential" and the like are only intended to facilitate the description of the present disclosure and simplify the description based on oriental or positional relationships shown in the accompanying drawings, not to indicate or imply that the apparatus or element referred must have a specific orientation, is constructed and operated in a specific orientation, and therefore cannot be understood as a limitation of the present disclosure.

Unless otherwise specified and limited, the specific meanings of all technical and scientific terms used in the specification can be specifically understood by persons of ordinary skill in the art. The terms used in the specification of this application is for the purpose of describing specific embodiments only and is not intended to limit this application.

Figure 1:
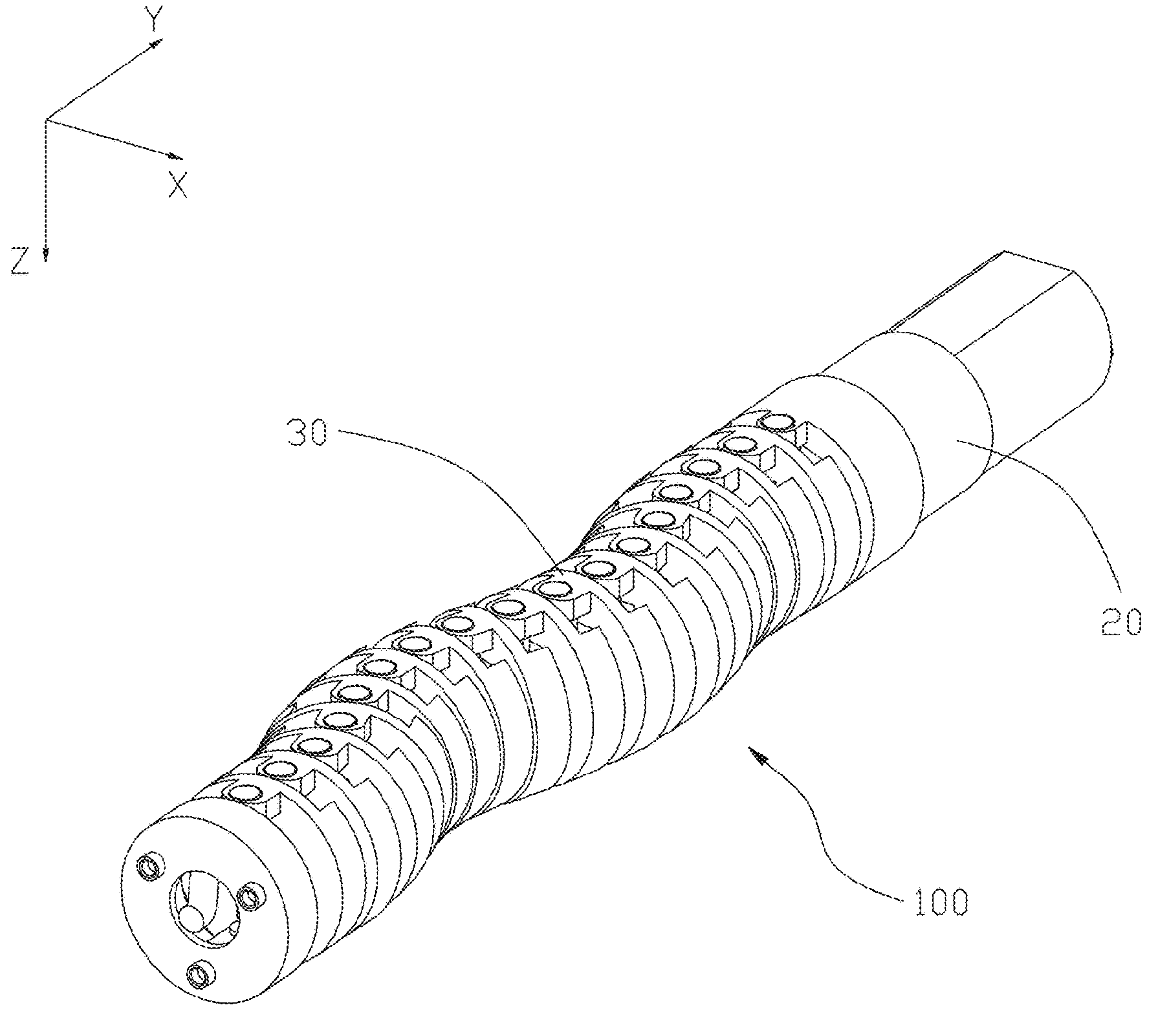
FIG. 1 is an isometric, assembled view of a massage device according to an embodiment of the present disclosure.
Figure 2A:
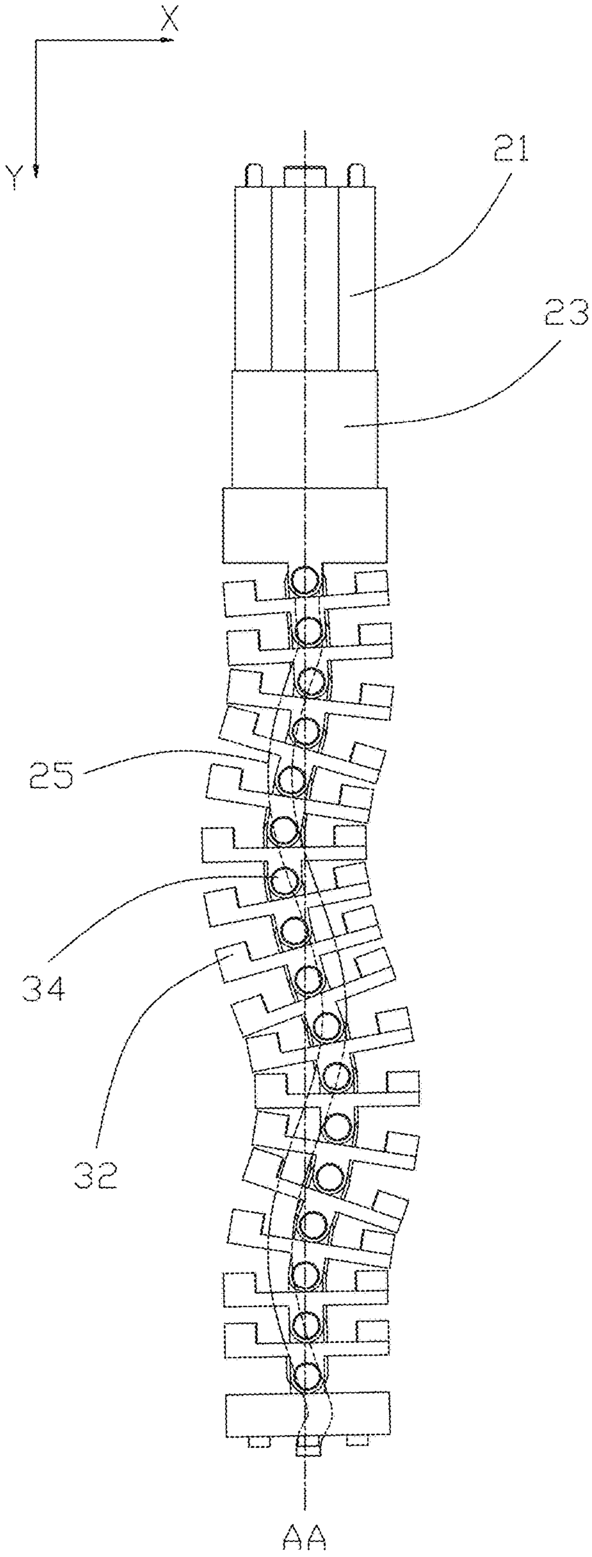
FIG. 2*a* is a top view of the massage device of FIG. 1.
Figure 2B:
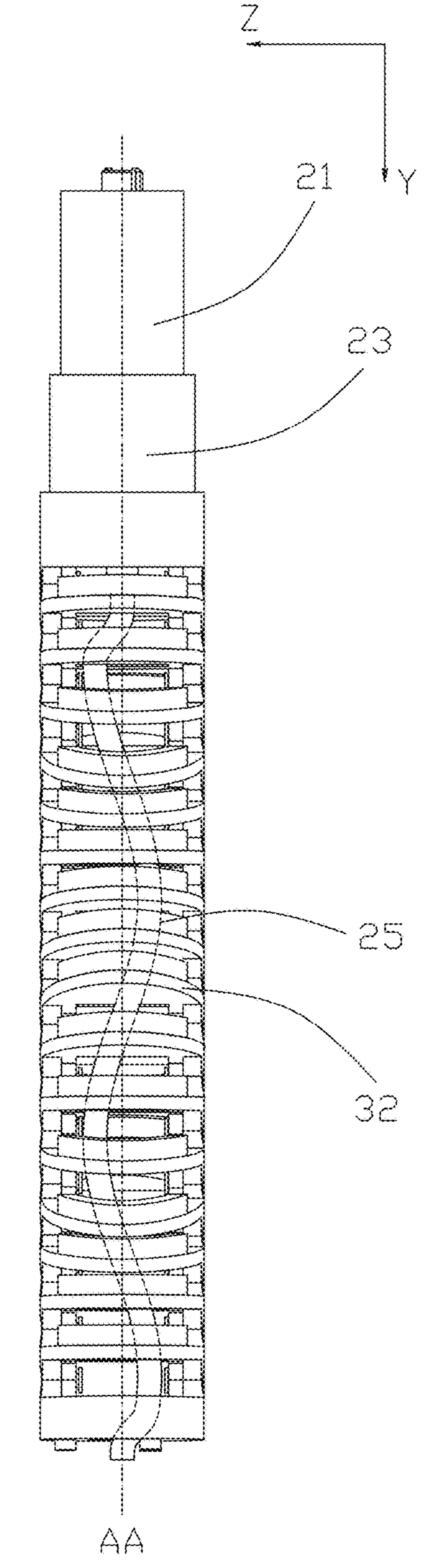
FIG. 2*b* is a side view of the massage device of FIG. 1.
Figure 3:
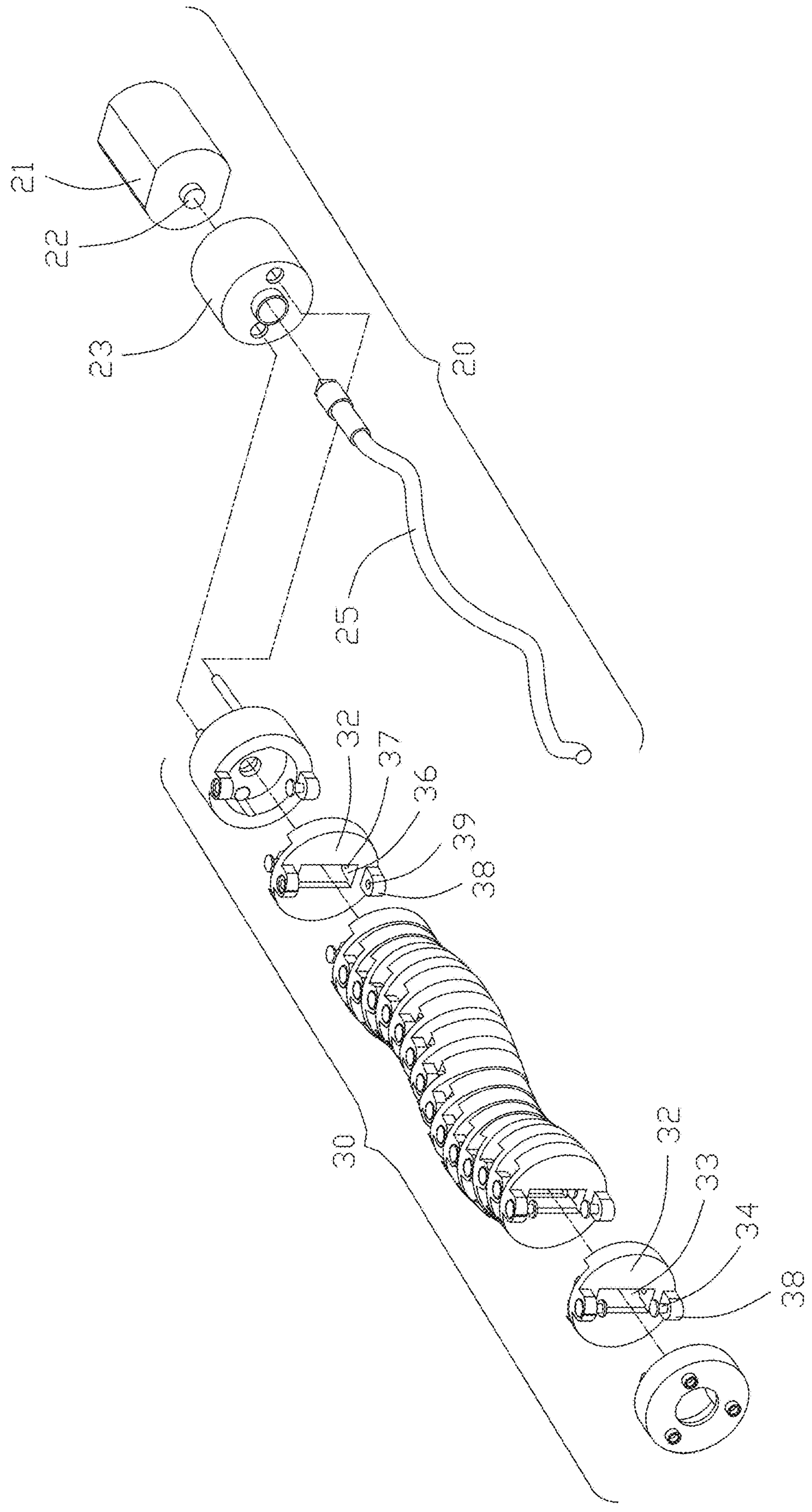
FIG. 3 is an exploded view of the massage device of FIG. 1.

Referring to FIG. 1 to FIG. 3, a massage device 100 according an embodiment of the present disclosure is shown. In this embodiment, the massage device 100 includes a driving module 20 and a first massage module 30 connected to the driving module 20 in a transmission way.

As shown in FIG. 3, the driving module 20 includes a rotary motor 21, a gearbox 23, and a rotary rod 25. The rotary motor 21 serves as a power mechanism of the massage device 100 and has an output shaft 22 rotating at high-speed. The gearbox 23 is connected to the output shaft 22 of the rotary motor 21, and includes a gear housing and a plurality of gears arranged in the gear housing. The rotary rod 25 is connected to an output gear of the gearbox 23, and rotates about a rotary axis AA (as shown in FIG. 2*a* and FIG. 2*b*) under the driving of the gearbox 23. Through the deceleration effect of the gearbox 23, the rotary rod 25, compared to the output shaft 22 of the rotary motor 21, has a much smaller rotary speed and greater torque.

Figure 4:
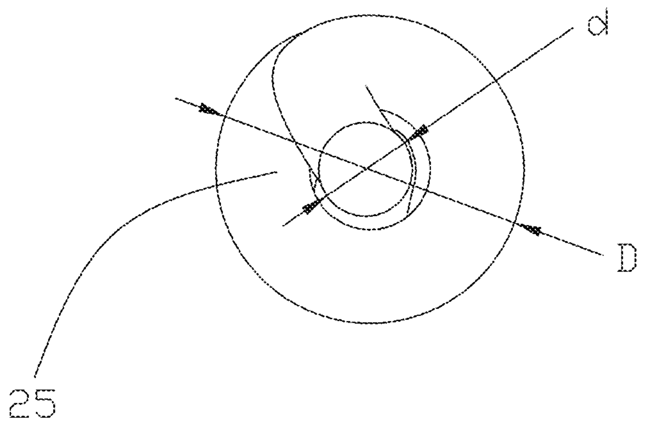
FIG. 4 is a front view of a rotary rod of the massage device of FIG. 1.

In this embodiment, the rotary rod 25 is generally configured as a curved rod, and as a whole is elongated in a direction along which the rotary axis AA extends (i.e., Y-direction). Preferably, the rotary rod 25 extends spirally along the Y-direction. A bending direction and/or curvature of the rotary rod 25 may vary at different positions thereof. Referring to FIG. 2*a* and FIG. 2*b*, a projection of the rotary rod 25 in a plane on which the rotary axis AA is located (such as XY-plane, YZ-plane) is generally wave-shaped; and, a projection of the rotary rod 25 in a plane perpendicular to the rotary axis AA (such as XZ-plane) is basically circular-shaped, with the rotary axis AA as a central axis, as shown in FIG. 4.

A connecting element, such as a shaft coupling, may be provided to connect an end of the rotary rod 25 to the gearbox 23, so that the rotary rod 25 can rotate along with the gearbox 23. In addition, a transmission unit, such as a gear transmission unit, a chain transmission unit, a belt transmission unit, and etc., may be provided between the rotary rod 25 and the gearbox 23, so as to achieve long-distance power transmission, facilitating the arrangement of the rotary motor 21 and/or gearbox 23. In addition, through the transmission unit, the direction of power transmission may be changed, so that the rotary axis AA of the rotary rod 25 may be angled with a rotary axis of the rotary motor 21.

The first massage module 30 includes a plurality of first massage members 32 arranged in a line along the rotary axis AA. For each two neighboring first massage members 32, a first pivot 34 is provided to hinge them together. In a specific embodiment, the first pivot 34 hinged between the first massage members 32 may be configured as a rivet and extends along a first direction, such as Z-direction, so that the first massage members 32 can rotate relative to each other in the XY-plane about a first axis, i.e., a central axis of the first pivot 34.

The first massage module 30 is connected to the gear housing of the gearbox 23 through one of the first massage members 32 which is located at the outermost side and close to the gearbox 23. In other embodiments, the first massage module 30 may be connected to any other fixed component, such as a shell supporting the gearbox 23/the rotary motor 21/the transmission unit and the like.

In this embodiment, a first hinged portion 36 with a first hole 37 defined therein is provided at a first side of each first massage member 32, and a second hinged portion 38 with a second hole 39 defined therein is provided at a second side of each first massage member 32. During assembly of the first massage module 30, the first hinged portion 36 of the first massage member 32 is overlapped with the second hinged portion 38 of a neighboring first massage member 32, with the first and second holes 37, 39 being aligned with each other, and the first pivot 34 is inserted into the first and second holes 37, 39 to connect two neighboring first massage members 32 together.

Figure 5:
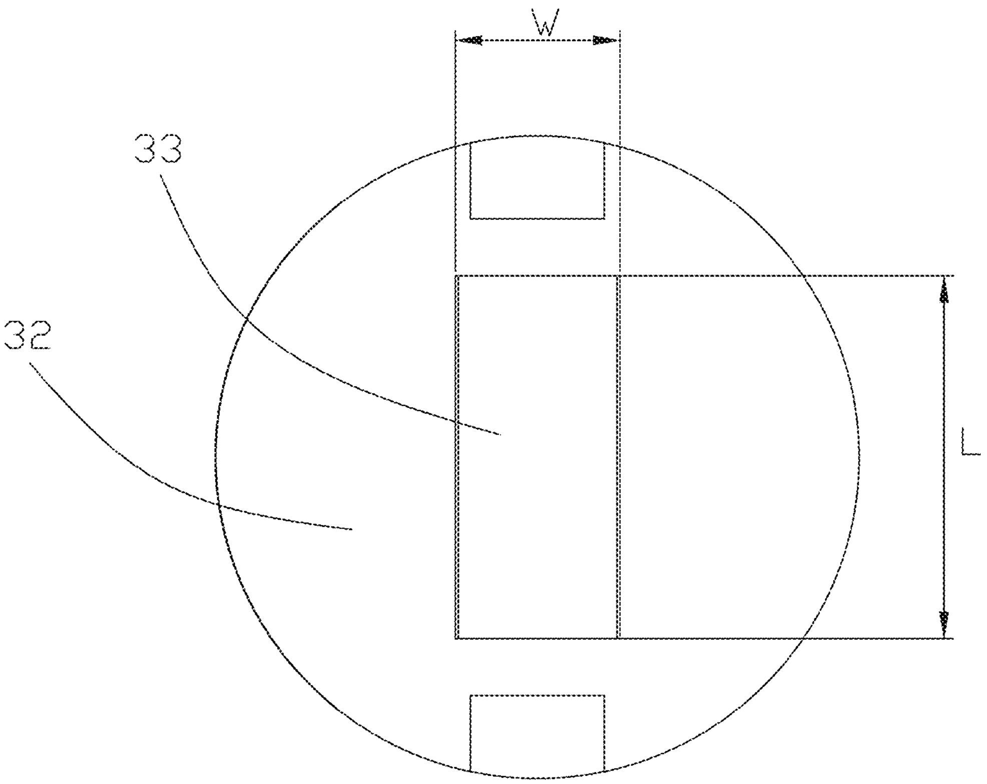
FIG. 5 is a front view of a first massage member of the massage device of FIG. 1.

Referring to FIG. 3 and FIG. 5, each first massage member 32 is generally circular and sheet-like. An elongated engaging hole 33 is defined in the first massage member 32 for extending of the rotary rod 25 therethrough. Specifically, the engaging hole 33 is rectangular-shaped, and has a length L in the first direction being greater than a width W in a second direction (such as X-direction). Preferably, the length L of the engaging hole 33 is substantially the same as or slightly greater than an outer diameter D of the projection of the rotary rod 25 in the XZ-plane; and the width W of the engaging hole 33 is substantially the same as or slightly greater than a diameter d of the rotary rod 25 and less than the outer diameter D of the projection of the rotary rod 25 in the XZ-plane.

By means of the above designed dimensions of the engaging hole 33 and the rotary rod 25, the rotary rod 25 is generally fixed relative to the first massage member 32 in the X-direction, but is slidable relative to the first massage member 32 in the Z-direction along the engaging hole 33.

Figure 6C:
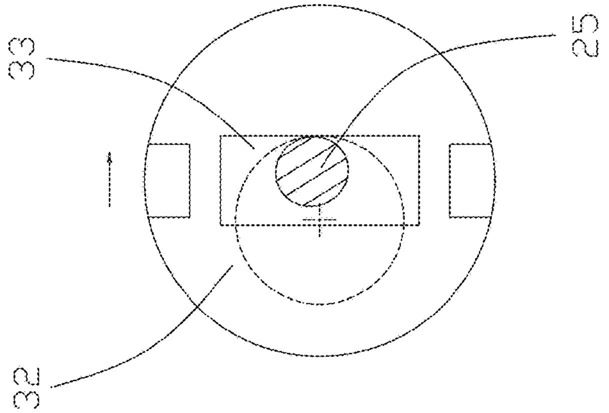
FIG. 6*c* shows a third state of the rotary rod and the first massage member during operation of the massage device.
Figure 6B:
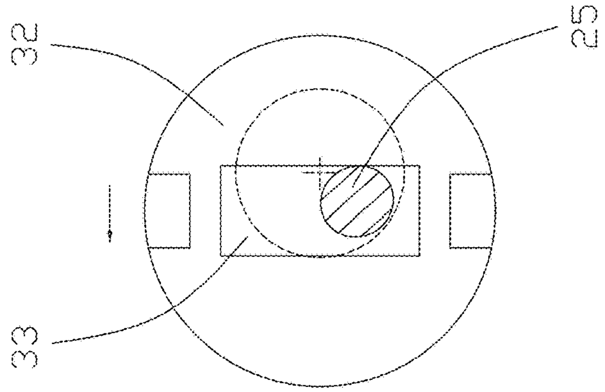
FIG. 6*b* shows a second state of the rotary rod and the first massage member during operation of the massage device
Figure 6A:
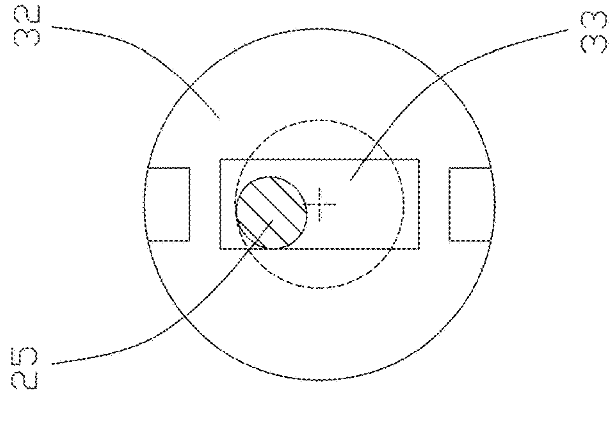
FIG. 6*a* shows a first state of the rotary rod and the first massage member during operation of the massage device.

When the rotary rod 25 is driven to rotate about the rotary axis AA, a trajectory of the rotary rod 25 in the XZ-plane is a circle, as shown by the dashed line in FIGS. 6*a*-6*c*. Thus, displacements are generated in both the X-direction and Z-direction during rotation of the rotary rod 25, wherein the displacement of the rotary rod 25 in the Z-direction makes it slide relative to the first massage member 32 along the engaging hole 33, so that the first massage member 32 remains stationary in the Z-direction; and the displacement of the rotary rod 25 in the X-direction drives the first massage member 32 to move along therewith. Therefore, rotational motion of the rotary rod 25 about the rotary axis AA is converted to liner motion of the first massage member 32 in the X-direction.

When the first massage member 32 is driven to move in the X-direction by the rotary rod 25, since the bending direction and/or curvature of the rotary rod 25 are different at different positions, the displacements of different first massage members 32 in the X-direction may be different from other, so that the first massage members 32 rotate relative to each other about the first pivot 34.

For the present massage device 100, as shown in FIG. 1 and FIG. 2*a*, each of the first massage member 32 is driven to move in the X-direction and swing about the first pivot 34 in the XY-plane, so that there is a certain deviation in the X-direction between the first massage members 32, and the first massage module 30 in whole is generally S-shaped and has a motion similar to the wriggling of a snake, which can provide better stimulation effects to the user, particularly to the user's sensitive areas, such as the female genitalia, the male genitalia and the like. Accordingly, the user's sexual experience is enhanced, and thus the user is more likely to reach orgasm with the help of the present massage device 100.

Figure 7:
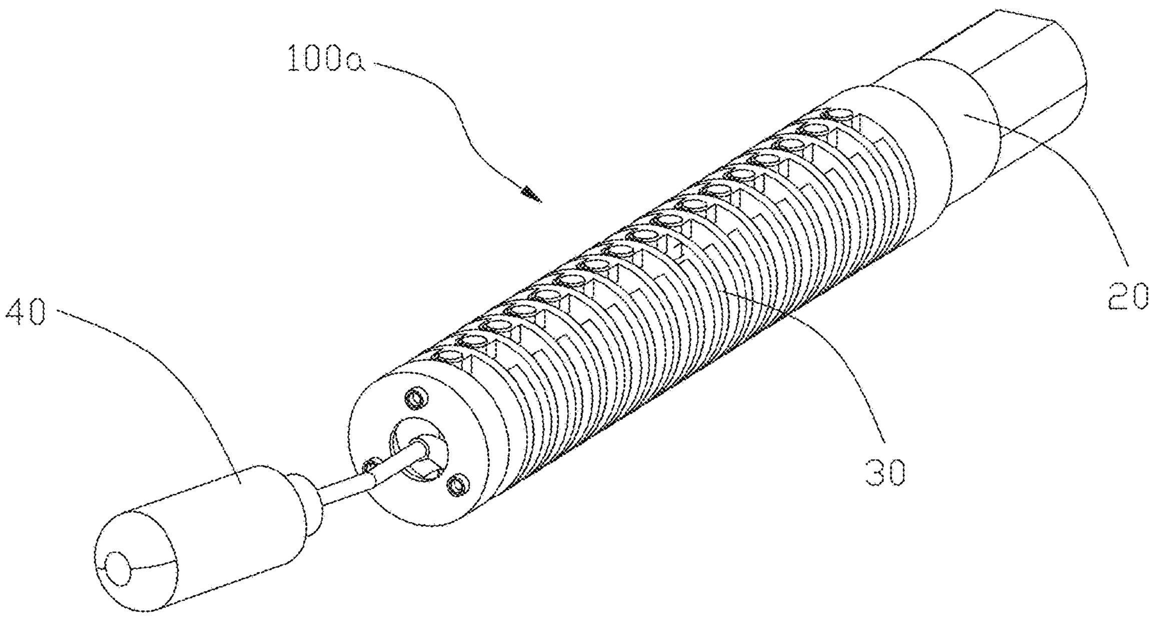
FIG. 7 is an isometric, assembled view of a massage device according to a second embodiment of the present disclosure.
Figure 8:
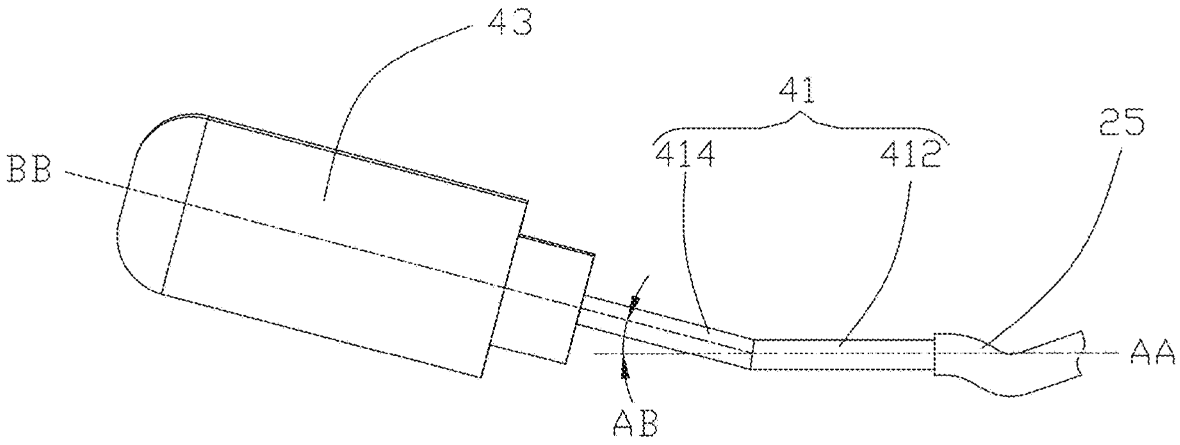
FIG. 8 is a schematic view of a second massage module of the massage device of FIG. 7.
Figure 9:
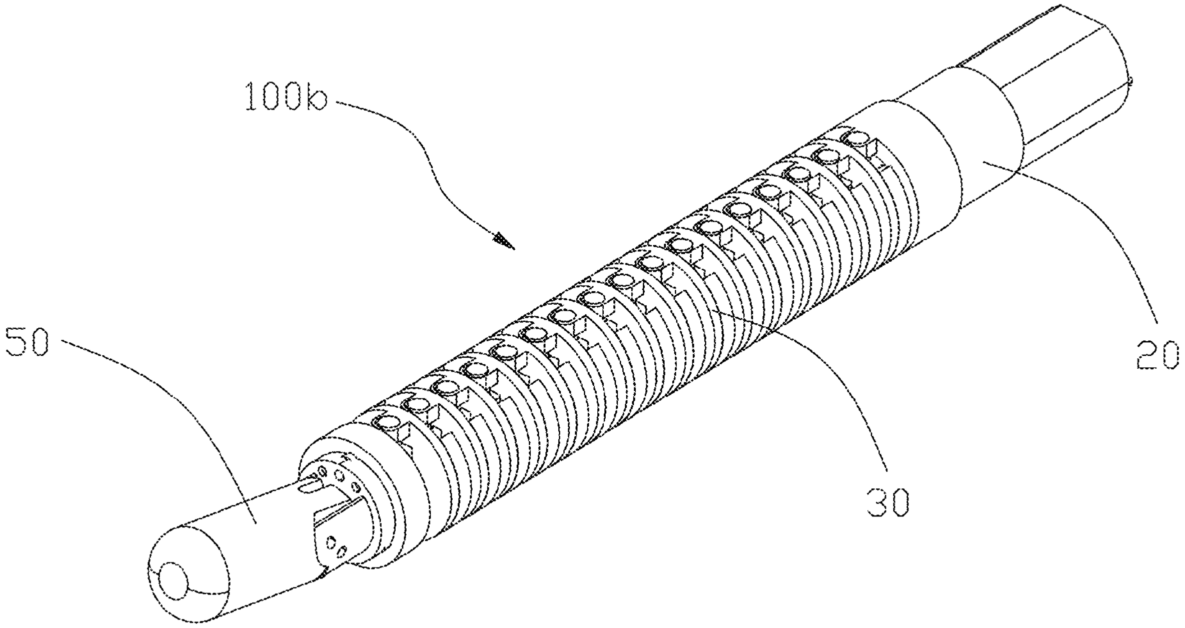
FIG. 9 is an isometric, assembled view of a massage device according to a third embodiment of the present disclosure.
Figure 10:
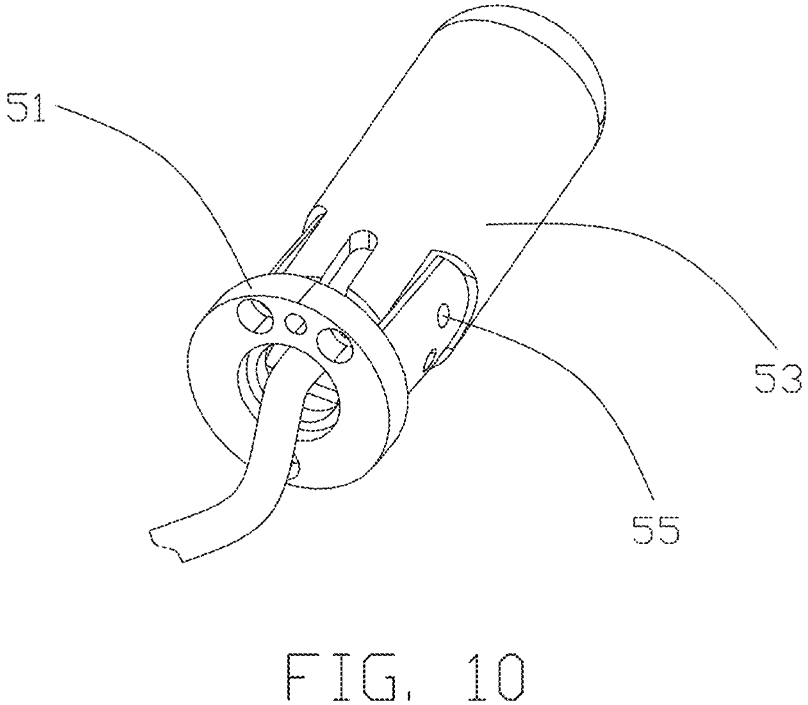
FIG. 10 is a schematic view of a second massage module of the massage device of FIG. 9.
Figure 11:
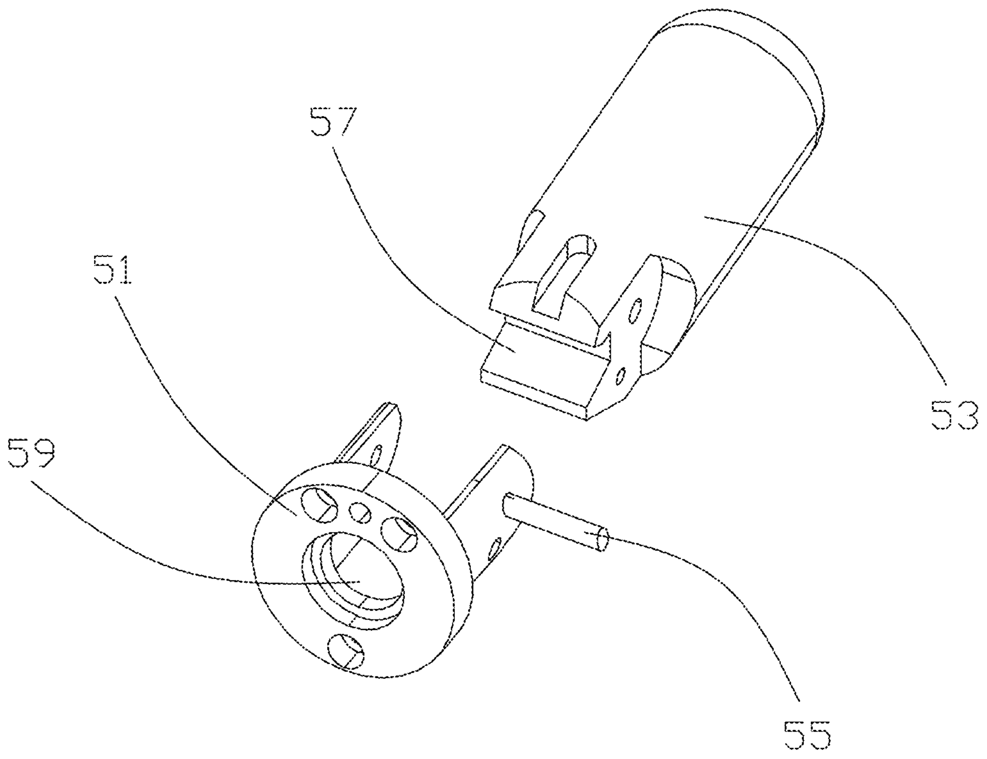
FIG. 11 is an exploded view of the second massage module of FIG. 10.
Figure 12:
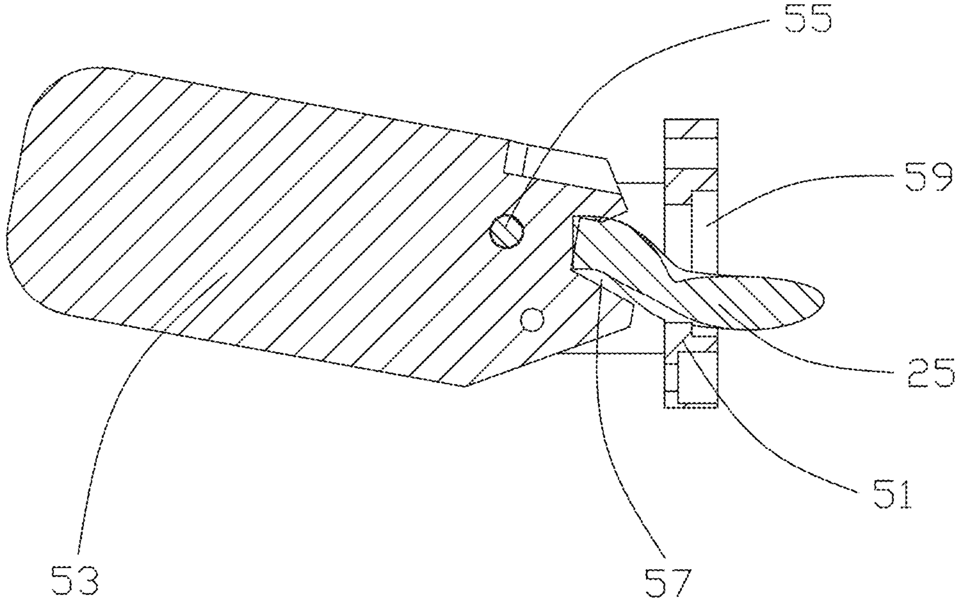
FIG. 12 is a cross sectional view of the second massage module of FIG. 10.
Figure 13:
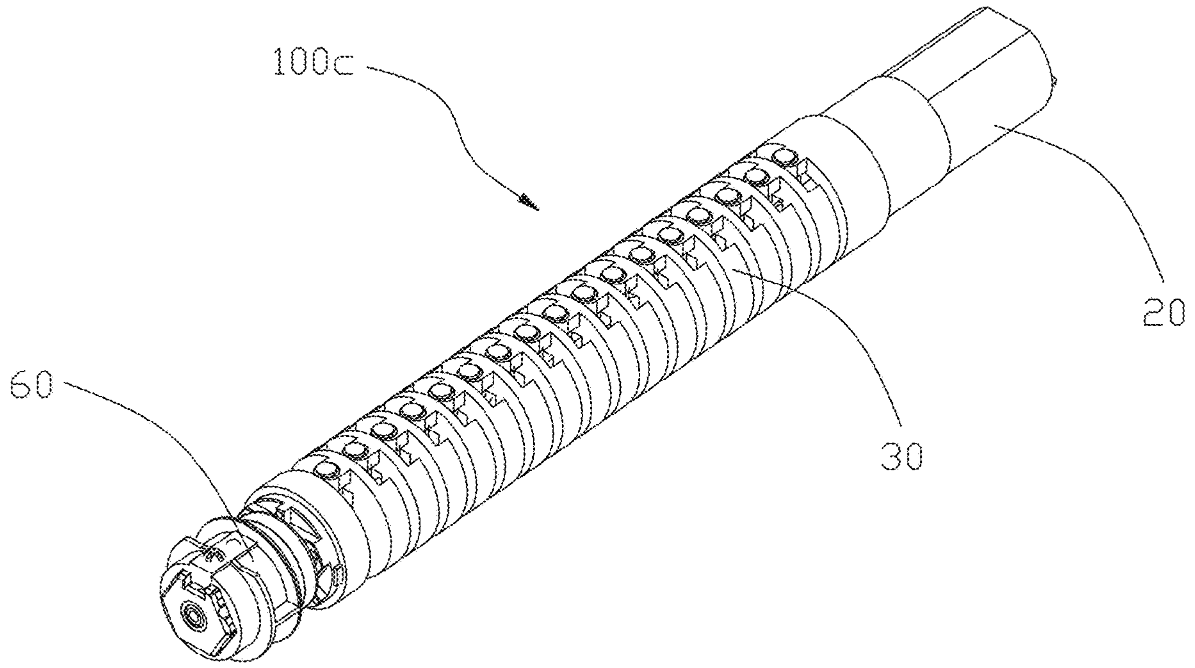
FIG. 13 is an isometric, assembled view of a massage device according to a fourth embodiment of the present disclosure.
Figure 14:
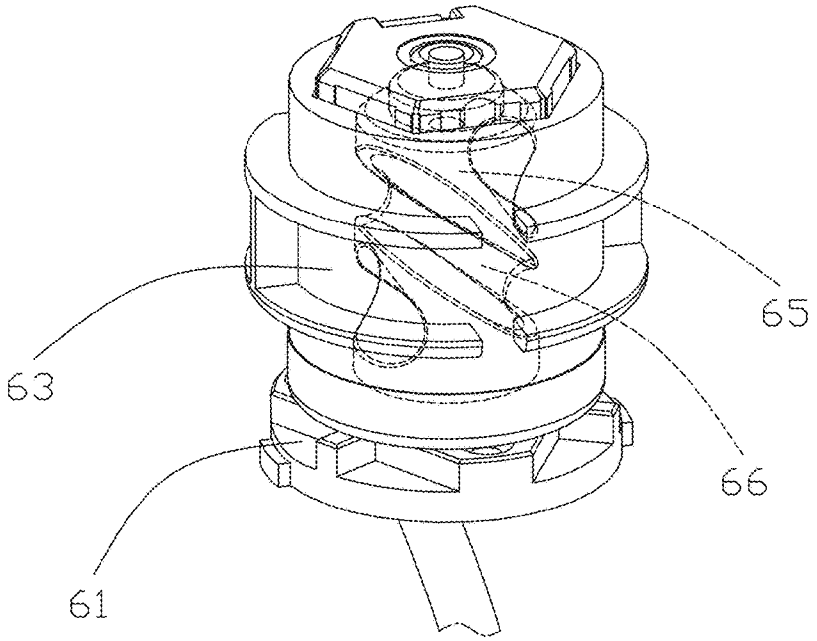
FIG. 14 is a schematic view of a second massage module of the massage device of FIG. 14.
Figure 15:
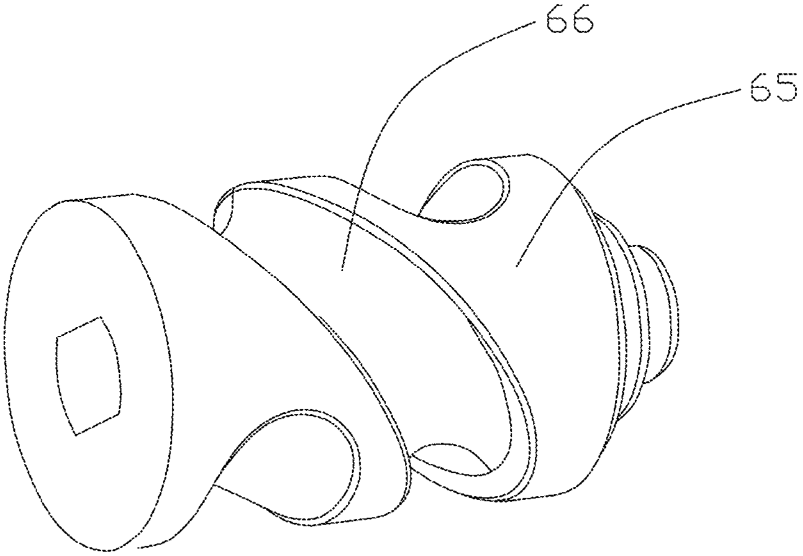
FIG. 15 is a schematic view of a transmission member of the second massage module of FIG. 14.
Figure 16:
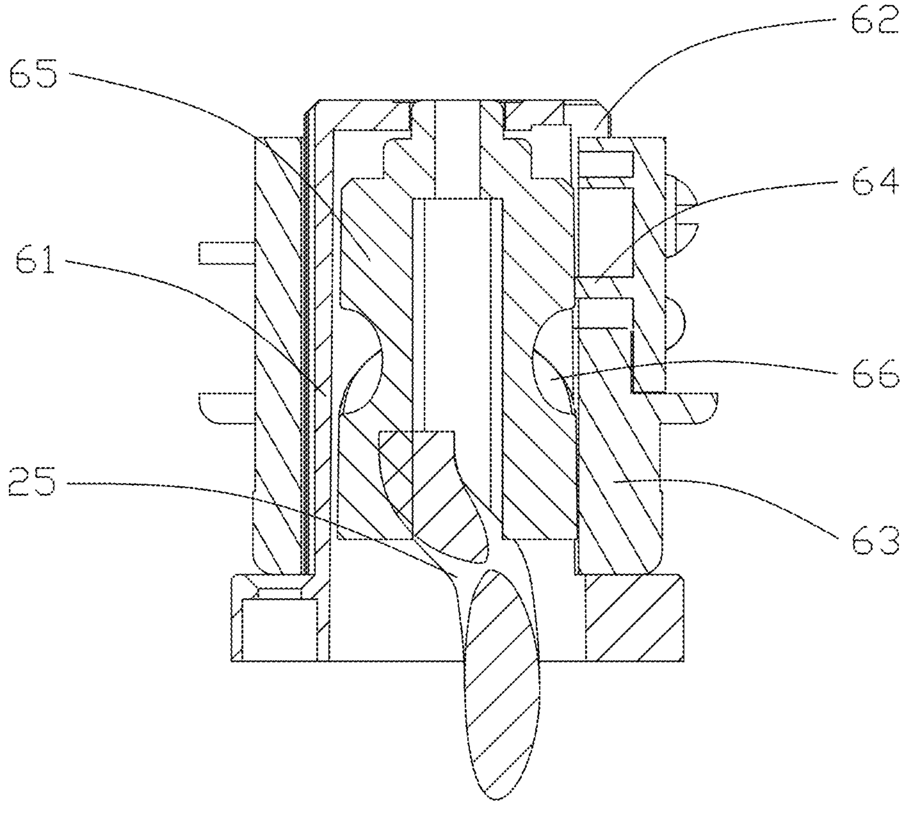
FIG. 16 is a cross sectional view of the second massage module of FIG. 14.
Figure 17:
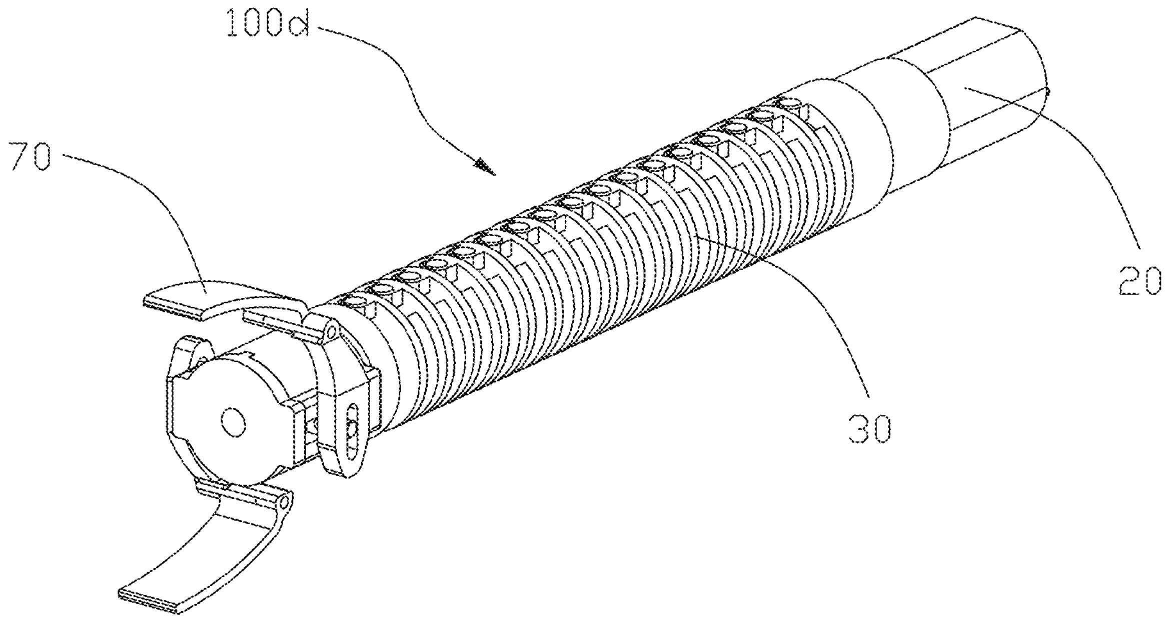
FIG. 17 is an isometric, assembled view of a massage device according to a fifth embodiment of the present disclosure.
Figure 18:
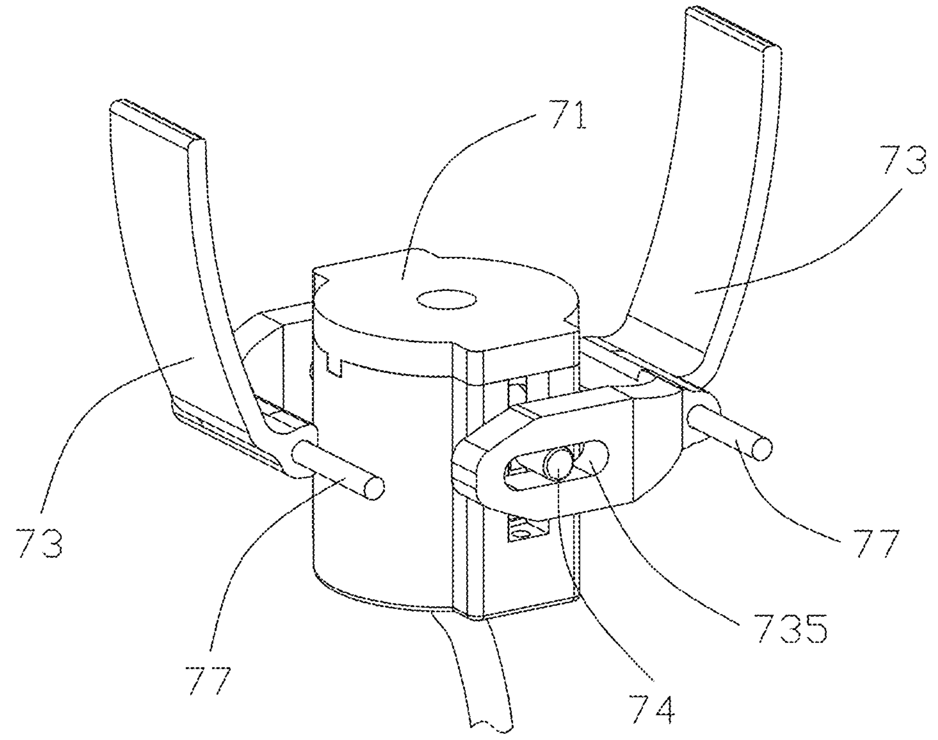
FIG. 18 is a schematic view of a second massage module of the massage device of FIG. 17.
Figure 19:
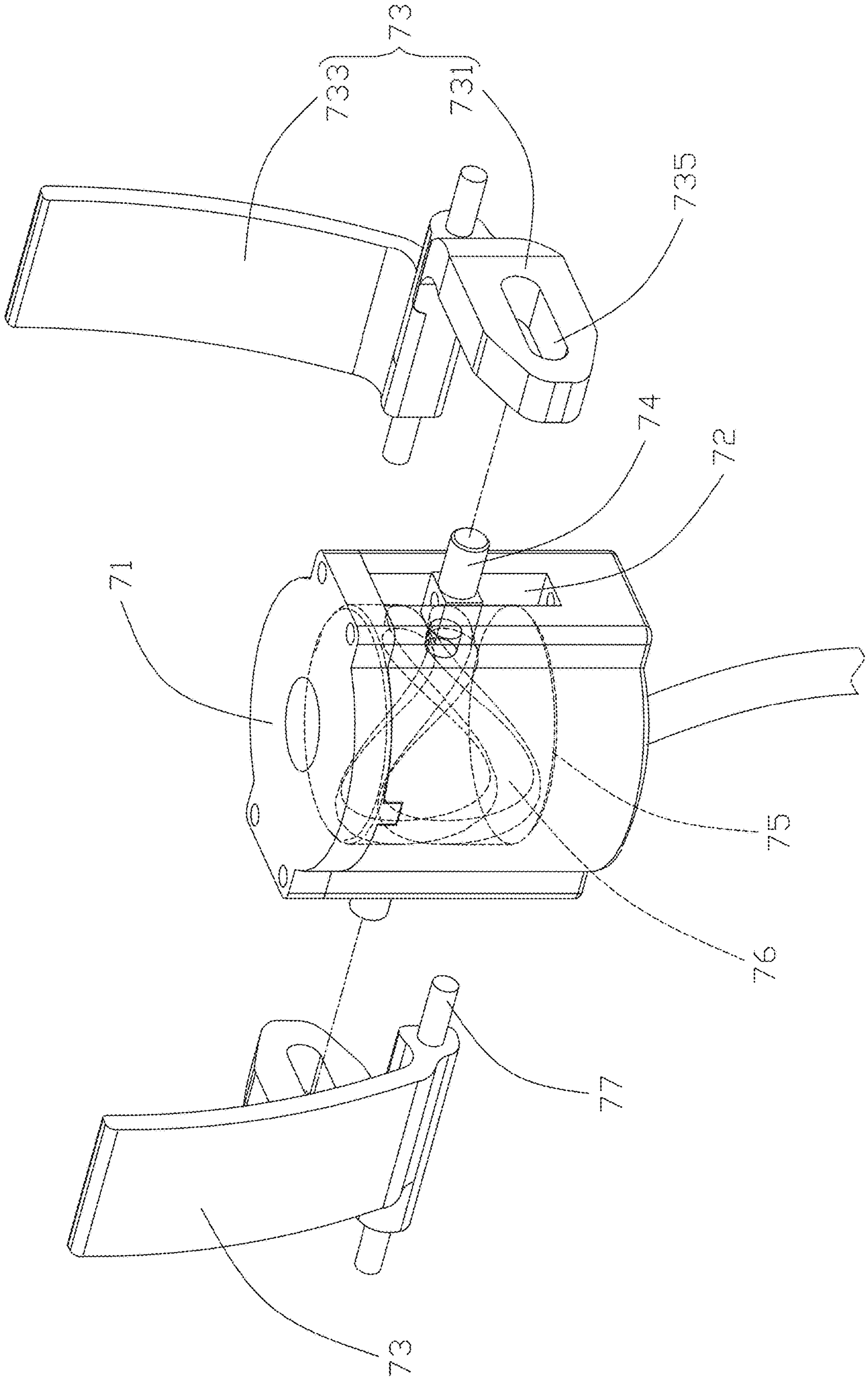
FIG. 19 is an exploded view of the second massage module of FIG. 18.
Figure 20:
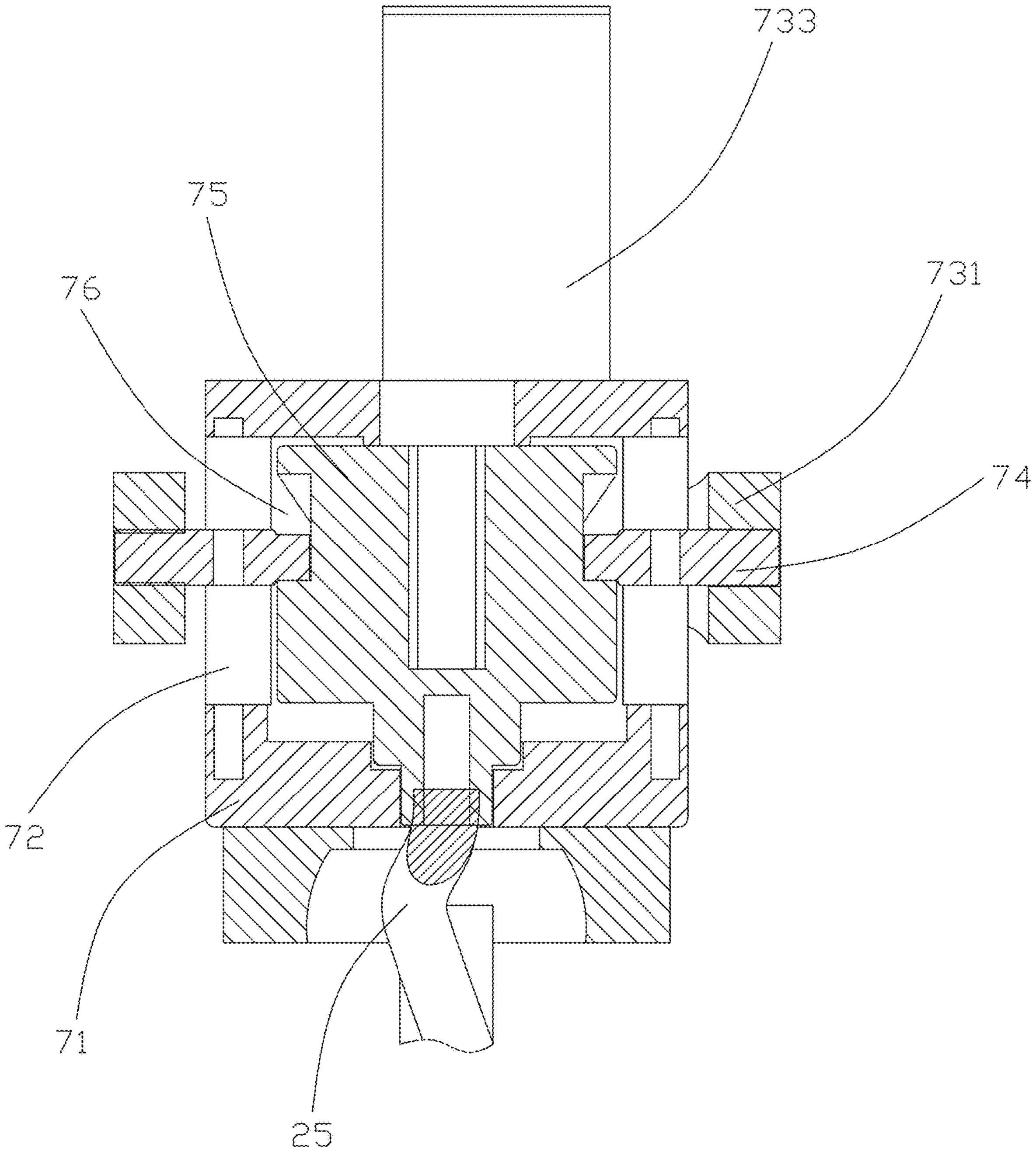
FIG. 20 is a cross sectional view of the second massage module of FIG. 18.

Referring to FIG. 7 to FIG. 8, a massage device 100*a* according to a second embodiment is shown. In this embodiment, the massage device 100*a* includes a driving module 20, a first massage module 30 and a second massage module 40, wherein the driving module 20 and the first massage module 30 are generally the same as that in the first embodiment, which will not be described here.

The second massage module 40 includes a transmission member 41 and a second massage member 43. The transmission member 41 is configured as an elongated rod, and includes a first segment 412 and a second segment 414, wherein the first segment 412 is connected to an end of the rotary rod 25 of the driving module 20 away from the gearbox 23, and the second segment 414 is connected to the second massage member 43. A central axis BB of the second segment 414 of the transmission member 41 is inclined relative to the rotary axis AA of the rotary rod 25. Under the driving of the rotary rod 25, the second segment 414 and the second massage member 43 connected to the second segment 414 revolve around the rotary axis AA of the rotary rod 25.

In this embodiment, the central axis BB of the second segment 414 of the transmission member 41 is inclined relative to that of the first segment 412, while the central axis of the first segment 412 is generally co-axial with the rotary axis AA of the rotary rod 25. A trajectory of the second massage member 43 is a circle around the rotary axis AA, wherein a radius of the trajectory may be determined according to an angle AB between the first segment 412 and the second segment 414. Preferably, the second massage member 43 is a vibration motor, which can generate high-frequency vibration during operation.

Compared with the first embodiment, the massage device 100*a* of this embodiment has two massage modules 30, 40 for simultaneously stimulate two parts of the human body, a stimulation area of this massage device 100*a* is thus enlarged and accordingly a stimulation effect is better. Furthermore, the second massage module 40 moves along a circular trajectory to knead the human body, providing a more comfortable sexual experience. Moreover, the second massage module 40 has the functions of rotation massage and vibration massage, further improving the stimulation effect of the massage device 100*a*.

Referring to FIG. 9 to FIG. 12, a massage device 100*b* according to a third embodiment is shown. In this embodiment, the massage device 100*b* includes a driving module 20, a first massage module 30 and a second massage module 50.

The second massage module 50 includes a mounting seat 51 and a second massage member 53. The mounting seat 51 is connected to the first massage module 30, such as one of the first massage members 32 which is located at the outermost side and away from the gearbox 23. The second massage member 53 is hinged to the mounting seat 51 by a second pivot 55, wherein the second pivot 55 extends along a direction perpendicular to the rotary axis AA of the rotary rod 25, such as along the second direction, i.e., the X-direction. The rotary rod 25 is configured to drive the second massage member 53 of the second massage module 50 to swing relative to the first massage module 30 about a second axis, i.e., a central axis of the second pivot 55.

Specifically, an elongated sliding slot 57, which is parallel to the second pivot 55, is defined in the second massage member 53 at an end thereof facing towards the first massage module 30, and an end of the rotary rod 25 away from the gearbox 23 extends through the mounting seat 51 and engages into the sliding slot 57. Correspondingly, a through hole 59 is defined in a central portion of the mounting seat 51 for extending of the rotary rod 25 therethrough. Alternatively, a transmission member may be provided to connect the second massage member 53 to the rotary rod 25.

During rotation, the displacement of the rotary rod 25 in the X-direction makes it slide relative to the second massage member 53 along the elongated sliding slot 57, and the displacement of the rotary rod 25 in the Z-direction drives the second massage member 53 to move along therewith, thereby the second massage member 53 being driven to swing about the second pivot 55 in the YZ plane, effectively stimulating a portion of the human body corresponding to the second massage member 53, further improving the stimulation effect of the present massage device 100*b*.

Referring to FIG. 13 to FIG. 16, a massage device 100*c* according to a fourth embodiment is shown. In this embodiment, the massage device 100*c* includes a driving module 20, a first massage module 30 and a second massage module 60.

The second massage module 60 includes a mounting seat 61, a second massage member 63 and a transmission member 65. The mounting seat 61 is connected to the first massage module 30, such as one of the first massage members 32 which is located at the outermost side and away from the gearbox 23. The transmission member 65 is rotatably mounted in the mounting seat 61 and connected to an end of the rotary rod 25 away from the gearbox 23 in a transmission way, so as to rotate along with the rotary rod 25. A sliding groove 66 is provided on an outer side of the transmission member 65, wherein the sliding groove 66 extends spirally.

The second massage member 63 is mounted around the mounting seat 61, and has a sliding pin 64 engaging into the sliding groove 66. A guiding groove 62 is defined in the mounting seat 61 and extends axially, for extending and sliding of the sliding pin 64. Through the cooperation of the sliding groove 66 and the sliding pin 64, rotational motion of the transmission member 65 is converted into linear reciprocating motion of the second massage member 63 in the axial direction of the mounting seat 61, which is preferably collinear with the rotary axis AA of the rotary rod 25, effectively stimulating a portion of the human body corresponding to the second massage member 63, further improving the stimulation effect of the present massage device 100*c*.

Referring to FIG. 17 to FIG. 20, a massage device 100*d* according to a fifth embodiment is shown. In this embodiment, the massage device 100*d* includes a driving module 20, a first massage module 30 and a second massage module 70.

The second massage module 70 includes a mounting seat 71, a pair of second massage members 73 and a transmission member 75. The mounting seat 71 is connected to the first massage module 30, such as one of the first massage members 32 which is located at the outermost side and away from the gearbox 23. The transmission member 65 is rotatably mounted in the mounting seat 61 and connected to an end of the rotary rod 25 away from the gearbox 23 in a transmission way, so as to rotate along with the rotary rod 25. A symmetric sliding groove 76 is provided on an outer side of the transmission member 75, wherein the symmetric sliding groove 76 is generally wave-shaped in a circumferential direction.

Each of the second massage members 73 includes a first arm 731 and a second arm 733 which are angled with each other. A shaft hole is defined at a junction of the first arm 731 and the second arm 733, and a shaft 77 extends through the shaft hole to rotatably connect the second massage member 73 to a fixed component. The first arm 731 defines an elongated hole 735 therein, a sliding pin 74 is provided with one end thereof engaged into the elongated hole 735 of the first arm 731 and another end thereof engaged into the sliding groove 76 of the transmission member 75. Correspondingly, an axial guiding groove 72 is defined in the mounting seat 71 for extending and sliding of the sliding pin 74.

Through the cooperation of the sliding groove 76 and the sliding pin 74, rotational motion of the transmission member 75 is converted into linear reciprocating motion of the sliding pin 74 in the axial direction of the mounting seat 71, which is preferably collinear with the rotary axis AA of the rotary rod 25. Since the second massage member 73 is rotatably connected to the fixed component by the shaft 77, axial movement of the sliding pin 74 results in rotation of the second massage member 73 about the shaft 77, so that the second arms 733 of the pair of the second massage members 73 swing towards each other or away from each other, thereby achieving an occlusion action to occlude a part of the human body between the two second massage members 73, further improving the stimulation effect of the present massage device 100*d*.

Finally, it should be noted that: the above merely describes preferred embodiments of the present disclosure without intention to limit the scope of the present disclosure. Although the present disclosure has been described in detail with reference to the foregoing embodiments, for those skilled in the art, the technical solutions described in the foregoing embodiments can still be modified, or some of the technical features can be equally replaced. Any modifications, equivalent replacements, improvements, and etc. made within the spirit and principle of the present disclosure should be within the scope of the present disclosure.

What is claimed is:

1. A massage device, comprising:

a driving module comprising a motor and a rotary rod connected to the motor in a transmission way, the rotary rod being rotatable about a rotary axis and extending curvedly along the rotary axis; and a first massage module comprising a plurality of first massage members being arranged in a line along the rotary axis, each first massage member being rotatable relative to a neighboring first massage member about a first axis perpendicular to the rotary axis;

wherein each first massage member defines an engaging groove through which the rotary rod extends, and the rotary rod is slidable relative to the first massage member in a first direction along which the first axis extends and is substantially fixed to the first massage member in a second direction which is perpendicular to the rotary axis and the first axis.

2. The massage device according to claim 1, wherein the rotary rod extends spirally along the rotary axis.

3. The massage device according to claim 2, wherein a projection of the rotary rod in a plane perpendicular to the rotary axis is circular-shaped, and a projection of the rotary rod in any plane on which the rotary axis is located is elongated and curved.

4. The massage device according to claim 3, wherein the engaging groove is configured with a length in the first direction being greater than a width in the second direction.

5. The massage device according to claim 4, wherein the length of the engaging groove is not less than a diameter of the projection of the rotary rod in a plane perpendicular to the rotary axis, and the width of the engaging groove is not less than a diameter of the rotary rod and less than the diameter of the projection of the rotary rod.

6. The massage device according to claim 1, wherein a gearbox is connected between the motor and the rotary rod, and a rotary speed of the rotary rod is less than that of the motor.

7. The massage device according to claim 1, wherein neighboring first massage members are hinged together by a first pivot extending along the first direction.

8. The massage device according to claim 1, further comprising a second massage module connected to the rotary rod in a transmission way.

9. The massage device according to claim 8, wherein the second massage module comprises a second massage member, and the rotary rod is configured to drive the second massage member to revolve around the rotary axis.

10. The massage device according to claim 9, wherein the second massage member comprises a vibration motor.

11. The massage device according to claim 9, wherein the second massage module further comprises a connecting rod, the connecting rod comprises a first segment connected to the rotary rod and a second segment connected to the second massage member, and the second segment is inclined relative to the first segment and the rotary axis.

12. The massage device according to claim 8, wherein the second massage module comprises a mounting seat connected to the first massage module and a second massage member hinged to the mounting seat, and the rotary rod is configured to drive the second massage member to swing about a second axis.

13. The massage device according to claim 12, wherein the second massage member defines a sliding slot which is elongated in a direction parallel to the second axis, and the rotary rod is slidably engaged in the sliding slot.

14. The massage device according to claim 12, wherein the second axis is perpendicular to the first axis.

15. The massage device according to claim 8, wherein the second massage module comprises a mounting seat connected to the first massage module, a transmission member being rotatably mounted in the mounting seat, and a second massage member mounted around the mounting seat, and the transmission member is configured to convert rotational motion of the rotary rod into linear reciprocating motion of the second massage member along the rotary axis.

16. The massage device according to claim 15, wherein the transmission member defines a spiral sliding groove in an outer surface thereof, and the second massage member comprises a sliding pin engaged into the spiral sliding groove.

17. The massage device according to claim 16, wherein the mounting seat defines an axial guiding groove through which the sliding pin extends.

18. The massage device according to claim 8, wherein the second massage module comprises a mounting seat connected to the first massage module, a transmission member being rotatably mounted in the mounting seat, and two second massage members being symmetrically arranged at two opposite sides of the mounting seat, respectively, and the connecting member is configured to convert rotational motion of the rotary rod into swinging motion of the second massage members towards or away from each other.

19. The massage device according to claim 18, wherein the transmission member defines a symmetrical sliding groove in an outer surface thereof, and each second massage member comprises a sliding pin engaged in the symmetrical sliding groove.

20. The massage device according to claim 19, wherein each second massage member further comprises a first arm and a second arm which are angled with respect to each other, the first arm is movably connected to the sliding pin, and the second arms swing towards or away from each other under the driving of the rotary rod.

* * * * *